United States Patent [19]
Hassan
[11] Patent Number: 4,463,404
[45] Date of Patent: Jul. 31, 1984

[54] SURGE VOLTAGE ARRESTER WITH SHIELDING BODIES ENCLOSING A COLUMN OF ARRESTER ELEMENTS

[75] Inventor: Mohamed A. Hassan, Berlin, Fed. Rep. of Germany
[73] Assignee: Siemens Aktiengesellschaft, Berlin & Munich, Fed. Rep. of Germany

[21] Appl. No.: 362,247
[22] Filed: Mar. 26, 1982

[30] Foreign Application Priority Data
Mar. 26, 1981 [DE] Fed. Rep. of Germany ....... 3112477

[51] Int. Cl.³ ............................................ H02H 9/06
[52] U.S. Cl. .................................. 361/128; 361/117; 361/130; 315/36
[58] Field of Search ............... 361/130, 128, 127, 126, 361/117; 315/36; 313/231.1

[56] References Cited

U.S. PATENT DOCUMENTS 3,087,094 4/1963 Nash .................................. 361/130
3,649,875 3/1972 Nagai et al. ......................... 361/130
3,753,045 8/1973 Osmundsen et al. ........... 361/130 X
3,821,608 6/1974 Johansson et al. .................. 361/127
4,340,924 7/1982 Kresge et al. ....................... 361/127
4,369,480 1/1983 Crucius et al. ................. 361/130 X

FOREIGN PATENT DOCUMENTS 1120567 7/1962 Fed. Rep. of Germany .
2348134 4/1974 Fed. Rep. of Germany .

*Primary Examiner*—Patrick R. Salce
*Attorney, Agent, or Firm*—Kenyon & Kenyon

[57] ABSTRACT

A surge voltage arrester, with a column of arrester elements arranged in a housing and several shielding bodies enclosing the column, includes voltage controlling elements arranged between the shielding bodies. The size and type of fastening of the voltage controlling elements can correspond to that of the support bodies which are likewise arranged between the shielding bodies. Through a distribution of the voltage controlling elements over the length of the surge voltage arrester, a uniform voltage distribution can be achieved if the arrester is installed ina grounded metal housing.

2 Claims, 3 Drawing Figures

SURGE VOLTAGE ARRESTER WITH SHIELDING BODIES ENCLOSING A COLUMN OF ARRESTER ELEMENTS

BACKGROUND OF THE INVENTION

This invention relates to surge voltage arresters in general and more particularly to a surge voltage arrester with an improved voltage distribution.

U.S. Pat. No. 4,369,480 describes a surge voltage arrester which comprises a column which is arranged in a housing and is formed by a multiplicity of arrester elements, several shielding bodies which enclose the column and are connected to each other by support bodies, and a device for fastening arrester elements. In the disclosed arrester, the shielding bodies are the supporting parts of the arrester elements and also have an effect on the voltage distribution over the length of the entire column of arrester elements. However, an uneven voltage distribution can nevertheless be brought about by closely adjacent grounded parts, for instance, the grounded metal encapsulation which acts as the housing of the column of arrester elements. This interferes with the operation of the surge voltage arrester.

By some surge voltage arresters, equalization of the voltage distribution has been accomplished by shunting voltage controlling elements in the form of capacitors across the series circuit of arrester elements (German Pat. No. 1 120 567). Further, in surge voltage arresters, having a column formed by arrester elements enclosed by shielding bodies, capacitors have been arranged between the shielding bodies for controlling the voltage (DE-OS No. 2 348 134, corresponding to Swiss Pat. No. 555 610).

It is an object of the invention, in an arrester such as that of U.S. Pat. No. 4,369,480 to improve the voltage distribution over the length of the surge voltage arrester, using voltage controlling elements.

SUMMARY OF THE INVENTION

For solving this problem, the present invention provides that, in a surge voltage arrester of this type mentioned at the outset, voltage controlling elements are arranged between adjacent shielding bodies. Superficially, this measure may appear to be the same as the known arrangement of capacitors between adjacent shielding rings. However, it goes contrary to the teaching of U.S. Pat. No. 4,369,480. For it was the opinion of those skilled in the art that in the arrangement with supporting shielding bodies according to U.S. Pat. No. 4,369,480, so good a shielding and capacitive effect on the arrester elements was provided that any further measures for controlling the voltage could be dispensed with.

An essential property of the present invention resides in the fact that the voltage controlling elements get into a mechanically parallel arrangement with the insulating support bodies provided between the shielding bodies. Their support action is enhanced by the voltage controlling elements, which makes a more favorable design possible. In this connection it is of advantage to make the size and type or manner of fastening of the voltage controlling elements the same as that of the insulating support bodies.

In some circumstances it may be desirable to achieve a voltage control with different effects locally. Within the scope of the present invention, this can be realized by arranging, with the same electrical design of the voltage controlling elements, a different number of elements from shielding body to shielding body, for compensating the influence of the ground capacity in the direction toward a uniform voltage distribution over the length of the surge voltage arrester.

DETAILED DESCRIPTION

Figure 1:
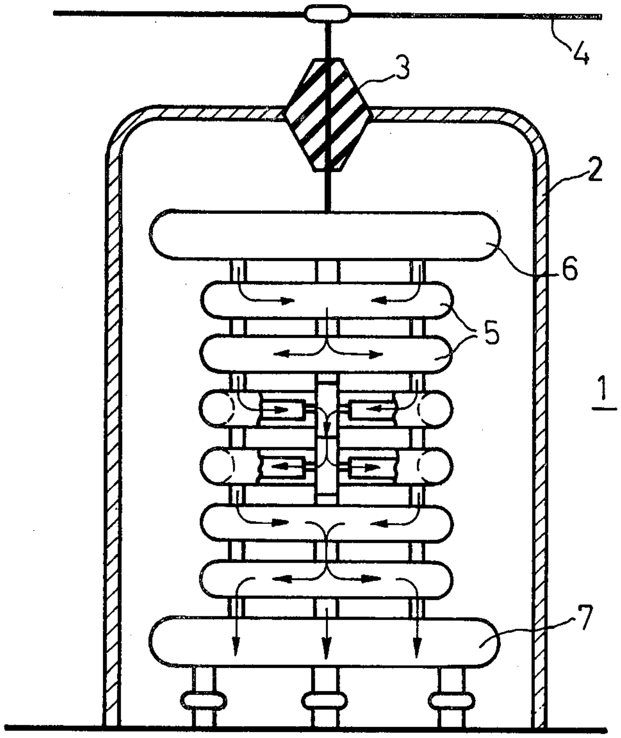
FIG. 1 is a side view of a surge voltage arrester.

The surge voltage arrester 1 according to FIG. 1 has a grounded metal housing 2 which is provided with a feedthrough 3 for connecting to conductor 4 which carries high voltage. In the interior of the housing 2 there is a column of arrester elements formed by shielding bodies 5, 6 and 7. The middle six shielding bodies 5 have a somewhat smaller diameter than the upper shielding body 6 and the lower shielding body 7. Each of these shielding bodies 5, 6 and 7 encloses a number of arrester elements comprising, for instance, voltage dependent resistors of the zinc oxide type or a combination of voltage dependent resistors and spark gaps.

Figure 2:
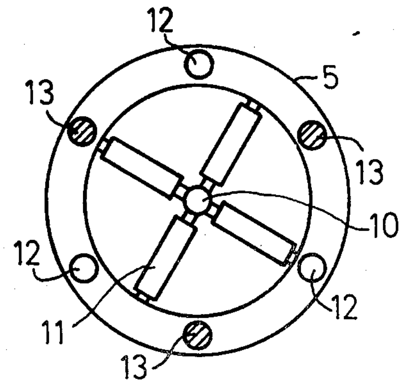
FIGS. 2 and 3 are cross sections of differently equipped surge voltage arresters of the type shown in FIG. 1.

In FIG. 2, as an example, four arrester elements 11 are shown arranged in star fashion between the central connecting body 10 and one of the shielding bodies 5. These may be zinc oxide resistors which are located in a separate housing. At the circumference of the shielding body 5 are three insulating support bodies 12 and likewise three voltage controlling elements 13, for instance, capacitors. Equal distances are provided between these parts 12 and 13. If required, a larger or smaller number of voltage controlling elements 13 can be accommodated. To this end, only the pitch angle must be changed accordingly so that two voltage controlling elements 13 rather than one voltage controlling element, can be accommodated, for instance, between two successive insulating support bodies 12.

Figure 3:
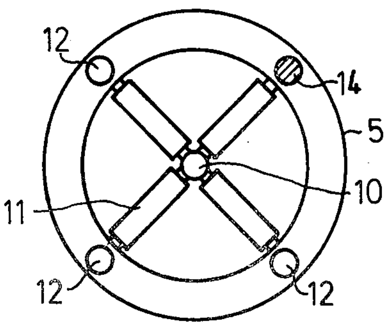

Another possibility for varying the number of voltage controlling elements is shown in FIG. 3. In this case, a voltage controlling element 14 is used which has substantially the same mechanical properties as the insulating support bodies 12, i.e., it also performs a support function like the support bodies. Due to this property, the voltage controlling element 14 can replace the insulating support bodies entirely or in part. Preserving a symmetrical arrangement of the insulating support bodies as in FIG. 2 is therefore unnecessary. Accordingly, in FIG. 3, three insulating support bodies 12 and one voltage controlling element 14 are shown arranged at the corners of a square.

What is claimed is:

1. An overvoltage arrester comprising a plurality of shielding elements each having an opening therethrough, the shielding elements being substantially superposed so that the openings are substantially aligned, a plurality of electrically interconnected arrester elements disposed in the substantially aligned openings, means associated with each of at least two adjacent shielding elements for fastening at least one arrester element to each of the two shielding elements and a plurality of support members disposed between adjacent shielding elements at the periphery of the openings in the shielding elements for supporting the shielding elements, the shielding elements providing support for the arrester elements fastened thereto, the arrester elements within a shielding element arranged in a cross- or star-shape manner with one end of each arrester element fastened to the shielding element and a connecting member centrally disposed relative to the shielding elements interconnecting the other ends of the individual arrester elements, the central connecting member being adapted to be connected to another central connecting member of adjacent groups of arrester elements, a first group of the support members cooperating with central connecting members associated with adjacent shielding elements to provide different current flow directions in arrester elements of adjacent shield elements, a second group of support members comprising insulating support members and a third group of support members comprising voltage controlling elements.

2. An overvoltage arrester according to claim 1, wherein the insulating support members and voltage controlling elements have the same size and are fastened in the same manner to adjacent shielding elements.

* * * * *